Dec. 11, 1945.  E. LONGDEN  2,390,841

FILTER

Filed Nov. 25, 1943

INVENTOR.
Eric Longden
BY Francis E. Boyce
Attorney

Patented Dec. 11, 1945

2,390,841

UNITED STATES PATENT OFFICE 2,390,841

FILTER

Eric Longden, Greenside, Johannesburg, Transvaal, Union of South Africa

Application November 25, 1943, Serial No. 511,662
In the Union of South Africa January 25, 1943

2 Claims. (Cl. 210—154)

This invention relates to filters for continuously separating foreign matter from a stream of fluid passing through the filter.

The object of the invention is to provide a filter chamber having means for giving the incoming fluid to be filtered a cyclonic motion said chamber being provided centrally with a vertical and generally cylindrical inner chamber walled with filtering material, and so placed as to be continually washed by the fluid being filtered. Another object is to provide in the lower part of the filter chamber and below the filtering cylinder a centrally disposed inverted bell-like baffle supported over an area baffled off so as to be unaffected by the cyclonic motion of the main portion of the fluid and into which the foreign matter taken from the fluid may be accumulated and removed. A further object is so to construct the filter chamber that it may be easily cleaned and the filtering medium renewed or reconditioned without undue loss of the fluid to be filtered.

Figure 1:
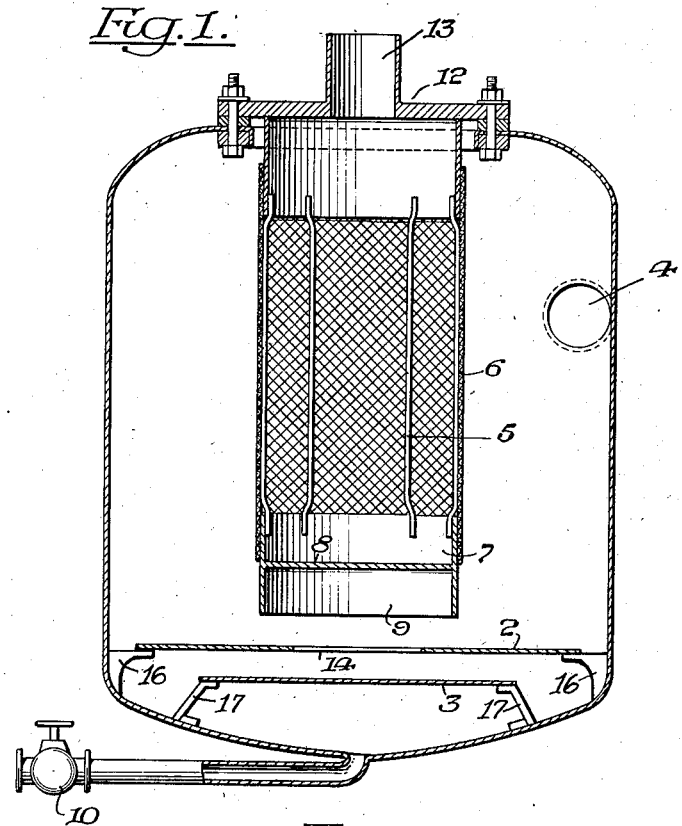

A preferred form of the invention is illustrated in the accompanying drawing in which:

Fig. 1 is a vertical section of one type of filter.

Figure 2:
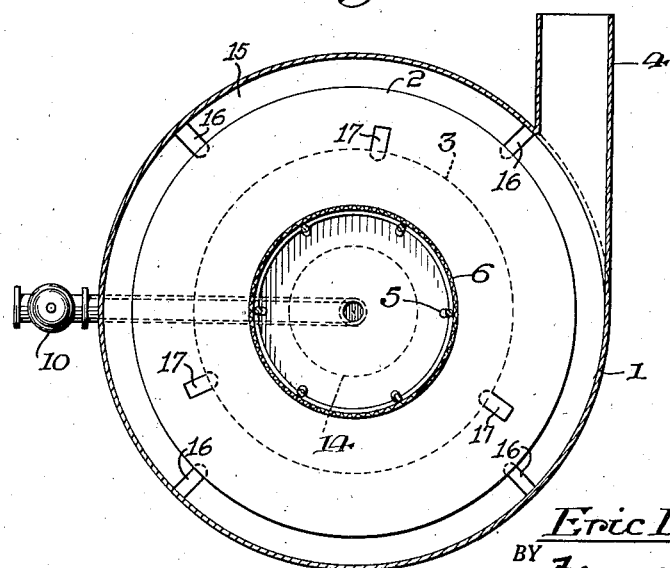

Fig. 2 a sectional plan of Fig. 1.

Like reference figures refer to similar parts throughout the drawing.

I is a cylindrical casing forming the filter chamber. 4 is the inlet for the fluid to be filtered; it is positioned tangentially to the cylinder I and generally in the upper portion thereof so that foreign matter of a higher specific gravity is thrown by the circular motion produced towards the circumferential wall I where it will tend to fall by gravity through the height of the chamber to accumulate out of the moving fluid as hereafter described. 6 is the filtering medium clamped to a cylindrical grid 5. Said grid 5 is closed at the bottom with an impervious cylindrical casing 7 and a plate 8 so fixed in 7 as to provide an inverted bell-like or open bottomed chamber 9. A short distance below 9 are baffles in the form of flat circular discs 2 and 3 hereafter described.

The grid 5 carrying the filtering medium 6 is secured to the top cover 12 of the chamber I in any convenient manner. 13 is the outlet for the cleaned and filtered fluid while 10 is a valve which may be opened to remove foreign matter separated from the raw fluid being filtered.

The drawing shows a filter adapted more particularly for filtering liquids and will be described in the operation of filtering petrol or liquid fuels for use in internal combustion engines. The liquid enters by inlet 4 under the necessary pressure to allow it to flow through the outlet 13 leading to the supply tank for clean fluid. On entering chamber I through the tangentially placed inlet 4 the fluid takes on a cyclonic motion. Foreign material in the fluid of higher specific gravity, for instance water and some dust, will be thrown out by centrifugal force and, sweeping round the inside walls of chamber I, will sink by gravity until it passes through annular gap 15 to below the level of baffle 2. Baffle 2 is simply a disc of smaller diameter than the inside of chamber I so that a narrow angular gap 15 is left between its edge and the wall I of the chamber. Baffle 2 restricts the circular movement of the liquid from spreading to the lower portion of chamber I below 2. The foreign matter which has not passed through the gap 15 and remaining in the liquid will be carried to the walls of the central cylinder, that is onto the filtering medium 6. The fluid passing through 6 into the inside of casing 5 is discharged through outlet 13 as filtered fluid.

Foreign material caught on the outside of the cylinder 6 is constantly being washed by the cyclonic movement of the fluid and tends to move downwards by gravity and fall off the bottom of the cylinder and through a central opening 14 in the disc 2 onto a lower plate or disc 3 which, as shown, is smaller in diameter than disc 2. Such material accumulating on disc 3 will gradually spread to overflow the edge of the disc 3 and drop to the bottom of the lower portion of cylinder I from where it can be drained off through the pipe leading to valve 10, together with any water or other fluid separated out, as above described. It will be understood that the fluid below disc 2 is relatively stagnant and therefore induces settlement of foreign material in the fluid therein.

The discs 2 and 3 may be supported in any suitable manner, as for instance by brackets 16 and 17 projecting radially inward from the wall of the chamber I.

The cyclonic motion of the fluid tends to form a vortex or centre of lower pressure below the inverted chamber 9 into which the lighter portion of the foreign matter will accumulate and become consolidated by the swirling movement of the fluid until it passes through the opening 14 to be removed with other foreign matter as already described. The inverted chamber 9 prevents such separated matter from rising through the bulk of the fluid in chamber I and so contaminate the filter 6.

As and when required the filtering medium can be lifted with the cover 12 of the chamber I when it can be cleaned or renewed. During such cleaning operation the accumulated foreign material between the baffles may be removed.

This invention provides a filter for fluids acting to separate out the heavier particles by centrifugal force and using the cyclonic motion of the fluid being filtered to wash the surface of the filtering medium. The material washed from the filtering medium is also removed by gravity to join the heavier material first removed while the still lighter material accumulates in and is removed from a zone of lower pressure. Such removed material is continuously collected in a zone of stagnant fluid.

The invention may be applied to the filtering of any fluids whether liquid or gaseous.

It will be obvious that a large filtering area is provided by this invention said filtering surface being very much greater in area than the outlet for the filtered fluid resulting in a good flow of fluid through the filter. The velocity of the flow of the fluid is used and makes for the efficiency of the filter.

What I claim as new and desire to secure by Letters Patent is:

1. In a filter for treating moving fluids, the combination of a vertically disposed cylindrical chamber having a removable cover and provided with a tangentially disposed inlet for the fluid to be filtered, said tangential inlet communicating with the cylindrical chamber above the transverse center line thereof, a vertically disposed inner cylindrical member secured to said removable cover and depending therefrom centrally within said chamber, said inner member communicating with an outlet port in said cover, the cylindrical wall of said member comprising a filtering medium, means for closing the lower end of said inner member, a pair of circular discs forming baffles disposed below said inner cylindrical member in concentrically superimposed spaced relation to each other and to the lower end of said inner cylindrical member, said discs being smaller in diameter than the cylindrical chamber thereby forming an open space between the wall of the chamber and the peripheries of the discs, the uppermost disc having a central opening therein, and a drain in communication with the cylindrical chamber below said discs for removing foreign matter from the chamber.

2. A filter for treating moving fluids, comprising a vertical cylindrical chamber, a removable cover for said chamber, a cylinder of filtering material vertically disposed centrally within said chamber and secured to the cover thereof, an inverted bell-like member closing the lower end of said filtering cylinder, and a pair of discs horizontally disposed at some distance below said filtering cylinder and in concentric relation thereto, said discs being vertically spaced apart from each other, the uppermost disc being of larger diameter than the lower disc and smaller than the cylindrical chamber, said uppermost disc having a centrally disposed opening therein, said cylindrical chamber having a tangentially disposed inlet port above its transverse center line and a fluid outlet port disposed centrally of its cover in communication with said filtering cylinder, said cylindrical chamber also having a centrally disposed outlet port in its bottom wall below the lower disc.

ERIC LONGDEN.